US008566575B2

(12) United States Patent  (10) Patent No.: US 8,566,575 B2
Chan et al.  (45) Date of Patent: Oct. 22, 2013

(54) COMPUTER APPARATUS AND METHOD FOR CHARGING PORTABLE ELECTRONIC DEVICE USING THE COMPUTER APPARATUS

(75) Inventors: Chong-Kim Chan, Taipei (TW); Yu-Guang Chen, Taipei (TW)

(73) Assignee: Asrock Inc., Taipei (TW)

( * ) Notice: Subject to any disclaimer, the term of this patent is extended or adjusted under 35 U.S.C. 154(b) by 146 days.

(21) Appl. No.: 13/234,567

(22) Filed: Sep. 16, 2011

(65) Prior Publication Data

US 2012/0072711 A1 Mar. 22, 2012

(30) Foreign Application Priority Data

Sep. 20, 2010 (TW) .............................. 99131834 A

(51) Int. Cl.
 *G06F 9/00* (2006.01)
 *G06F 15/177* (2006.01)
(52) U.S. Cl.
 USPC ........................................................... 713/2
(58) Field of Classification Search
 None
 See application file for complete search history.

(56) References Cited

U.S. PATENT DOCUMENTS

| | | | | |
|---|---|---|---|---|
| 2004/0102917 A1* | 5/2004 | Chen et al. | .................... | 702/120 |
| 2005/0154894 A1* | 7/2005 | Freudenschuss | ............. | 713/182 |
| 2007/0079030 A1* | 4/2007 | Okuley et al. | ................... | 710/62 |
| 2009/0228734 A1* | 9/2009 | Kakie | ........................... | 713/501 |
| 2010/0219790 A1* | 9/2010 | Chadbourne et al. | ........ | 320/107 |

FOREIGN PATENT DOCUMENTS

| | | |
|---|---|---|
| CN | 101377707 | 3/2009 |
| CN | 101593990 | 12/2009 |
| TW | 200408931 A | 6/2004 |
| TW | 200941202 | 10/2009 |

OTHER PUBLICATIONS

English translation of abstract of CN 101593990.
English translation of abstract of TW 200941202.
English translation of abstract of CN 101377707.
English translation of abstract of TW 200408931 A (published Jun. 1, 2004).

* cited by examiner

*Primary Examiner* — Thomas Lee
*Assistant Examiner* — Zhipeng Wang
(74) *Attorney, Agent, or Firm* — McClure, Qualey & Rodack, LLP

(57) ABSTRACT

A computer apparatus and a method for charging a portable electronic device are provided. The method is implemented in a computer apparatus including a connector. The method includes: (a) detecting whether the portable electronic device is plugged and connected to the connector when the computer apparatus is in a power off state; (b) causing the computer apparatus to execute a boot process if the portable electronic device is plugged and connected to the connector; (c) determining whether the portable electronic device is a predetermined device; (d) sending a charging command to the portable electronic device such that the portable electronic device derives a charging current from the computer apparatus if the portable electronic device is the predetermined device; and (e) causing the computer apparatus to shut down before an operating system is loaded.

12 Claims, 2 Drawing Sheets

COMPUTER APPARATUS AND METHOD FOR CHARGING PORTABLE ELECTRONIC DEVICE USING THE COMPUTER APPARATUS

CROSS-REFERENCE TO RELATED APPLICATIONS

This Non-provisional application claims priority under 35 U.S.C. §119(a) on Patent Application No(s). 099131834 filed in Taiwan, Republic of China on Sep. 20, 2010, the entire contents of which are hereby incorporated by reference.

BACKGROUND OF THE INVENTION

1. Field of the Invention

The present invention relates to a charging method, and more particularly, to a computer apparatus and a method for charging a portable electronic device using the computer apparatus.

2. Description of Related Art

In recent years, advancement of semiconductor technology has resulted in increasingly higher performance as well as smaller size and lower price of computer apparatus (e.g. desktop or notebook computers), which has thus contributed to the computer popularization. With the increasingly widely use of computers in work and entertainment, computers have entered our daily life.

In addition, due to the vigorous development of information industry, portable electronic devices with various functions and of various types (e.g. portable media players and mobile phones) have been developed and commercialized. In general, portable electronic devices can be connected to a computer apparatus for data transmission therebetween. Some portable electronic devices may be charged by power of the computer apparatus. Under a power on state of the computer apparatus, some portable electronic device having charging function may activate its charging function in response to a charging command sent by an operating system running on the computer apparatus. However, when the computer apparatus is in a power off state, the portable electronic device having charging function may be unable to communicate with the computer apparatus for activating the charging function and, as a result, these portable electronic device cannot be charged.

SUMMARY OF THE INVENTION

Accordingly, the present invention is directed to a computer apparatus and a method for charging a portable electronic device using the computer apparatus. When the portable electronic device is plugged to the computer apparatus while the computer apparatus is in a power off state, the computer apparatus executes a boot process and activates the charging function of the portable electronic device, such that the portable electronic device can be charged by the power received from the computer apparatus.

The present invention provides a method for charging a portable electronic device. The method is implemented in a computer apparatus comprising a connector. The method includes: (a) detecting whether the portable electronic device is plugged and connected to the connector when the computer apparatus is in a power off state; (b) causing the computer apparatus to execute a boot process if the portable electronic device is plugged and connected to the connector; (c) determining whether the portable electronic device is a predetermined device; (d) sending a charging command to the portable electronic device such that the portable electronic device derives a charging current from the computer apparatus if the portable electronic device is the predetermined device; and (e) causing the computer apparatus to shut down before an operating system is loaded.

In one embodiment, subsequent to step (e), the portable electronic device still continuously derives the charging current from the computer apparatus.

In one embodiment, the computer apparatus includes a connector controller having a plugging boot function. The steps for setting the plugging boot function includes: receiving a setting command when the computer apparatus is in a power on state; intercepting a shutdown signal of the computer apparatus during the period of shutting down of the computer apparatus; and setting the plugging boot function of the connector controller of the computer apparatus.

In one embodiment, step (c) further includes: (c1) sending an enquiry command to the portable electronic device to obtain a device identification code of the portable electronic device; and (c2) comparing the device identification code of the portable electronic device with a look-up table.

In one embodiment, step (b) further includes stopping outputting a display signal to a display device of the computer apparatus.

The present invention also provides a computer apparatus adapted for connecting with a portable electronic device. The computer apparatus includes a connector, a connector controller and a basic input/output system unit (BIOS unit). The connector is adapted for connecting with the portable electronic device. The connector controller is connected to the connector. The BIOS unit is connected to the connector controller and stores basic input/output system (BIOS) program therein.

When the computer apparatus is in a power off state, the connector controller detects whether the portable electronic device is plugged and connected to the connector. If the portable electronic device is plugged and connected to the connector, the connector controller causes the computer apparatus to execute the BIOS program of a boot process. If the BIOS program determines that the portable electronic device is a predetermined device, the BIOS program sends a charging command to the portable electronic device such that the portable electronic device derives a charging current from the computer apparatus. The BIOS program then causes the computer apparatus to shut down before an operating system is loaded.

In one embodiment, the connector controller has a plugging boot function enabling the computer apparatus to detect whether the portable electronic device is connected to the connector when the computer apparatus is in the power off state.

In one embodiment, the connector controller has a plugging boot function. The steps for setting the plugging boot function includes receiving a setting command when the computer apparatus is in a power on state; intercepting a shutdown signal of the computer apparatus during the period of shutting down of the computer apparatus; and setting the plugging boot function of the connector controller of the computer apparatus.

In one embodiment, the connector is a universal serial bus (USB) connector.

In one embodiment, the BIOS program sends an enquiry command to the portable electronic device to obtain a device identification code of the portable electronic device, and the BIOS program compares the device identification code of the portable electronic device with a look-up table to determine whether the portable electronic device is a predetermined device.

In one embodiment, the BIOS program controls the computer apparatus to stop outputting a display signal to a display device of the computer apparatus after the connector controller causes the computer apparatus to execute the boot process.

In view of the foregoing, in the method for charging a portable electronic device using the computer apparatus of embodiments of the present invention, the computer apparatus is caused to execute a boot process upon a portable electronic device is plugged thereto. During the boot process, it is detected whether the portable electronic device is a predetermined device so as to determine whether to send a charging command to the portable electronic device. As such, if the portable electronic device has the charging function, the computer apparatus can activate the charging function of the portable electronic device at any time.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
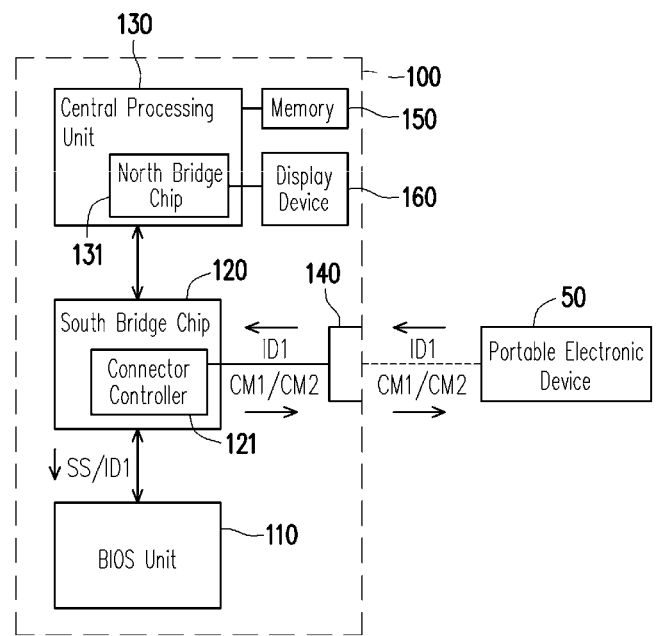
FIG. 1 is a system block diagram illustrating a computer apparatus and a portable electronic device according to one embodiment of the present invention.

FIG. 1 is a system block diagram illustrating a computer apparatus and a portable electronic device according to one embodiment of the present invention. Referring to FIG. 1, the computer apparatus 100 of this embodiment includes a basic input/output system unit (BIOS unit) 110, a South Bridge chip 120, a central processing unit 130, and a connector 140. The BIOS unit 110 may be a memory unit which stores basic input/output system (BIOS) codes and a look-up table recording one or more groups of device identification codes. The memory unit may be a non-volatile memory such as a flash memory.

In this embodiment, the South Bridge chip 120 further includes a connector controller 121 which may be a universal serial bus (USB) controller 121. The central processing unit 130 further includes a North Bridge chip 131. In this embodiment, the connector 140 is a USB connector for connecting with a portable electronic device 50. The South Bridge chip 120 is connected between the BIOS unit 110, the central processing unit 130 and the connector 140, in which the BIOS unit 110 connected to the connector controller 121. In addition, in another embodiment, the central processing unit 130 of the computer apparatus 100 may be an element of a different type or omitted the North Bridge chip 131 depending upon a different requirement of function or design, and the connector controller 121 may also be disposed out of the South Bridge chip 120. Therefore, the computer system described above is illustrative rather than limiting.

In the present embodiment, it is assumed that the computer apparatus 100 is in a power off state, but the connector controller 121 of the South Bridge chip 120 can still operate depending on the standby power of the motherboard of the computer apparatus 100. For example, a plugging boot function (as USB_Plug_Function, which will be described later) of the connector controller 121 is still active.

In the power off state of the computer apparatus 100, the connector controller 121 may detect whether an external device is plugged to the connector 140 via the plugging boot function of the connector controller 121. When the portable electronic device 50 is plugged to the connector 140 of the computer apparatus 100 through the connector of the portable electronic device 50 or a cable having a USB connector, the portable electronic device 500 is connected with the connector controller 121. Because the plugging boot function of the connector controller 121 is activated, the connector controller 121 is able to detect the plugging of the portable electronic device 50, such that the computer apparatus 100 is caused to execute a boot process. In the present embodiment, the boot process means execution of the BIOS codes.

Accordingly, When the connector 140 to be plugged and connected, the potential of a certain pin of the connector controller 121 are changed as a effect of depressing a power button, thus causing the computer apparatus 100 to execute the boot process. During the boot process, the South Bridge chip 120 of the computer apparatus 100 communicates with related electronic components (as super input/output chip (Super I/O)) inside the computer apparatus 100 such that various electronic components of the computer apparatus 100 are caused to ready the power thereof However, the present invention is not limited to this. Rather, in another embodiment, an embedded controller (EC) may also be used to replace the South Bridge chip 120 for the power-on function.

During the boot process, after the power of the various electronic components are ready, the South Bridge chip 120 sends a signal SS to the BIOS unit 110 to read BIOS codes in the BIOS unit 110, such that the BIOS codes are unrolled in the memory (DRAM) 150 and began to execute the unrolled BIOS codes.

The BIOS first executes a Power-On-Self-Test (POST) to initialize various peripheral components (i.e. including the connector controller 121) of the computer apparatus 100. Upon completion of the initialization of the connector controller 121, the BIOS then communicates with the portable electronic device 50 through the connector controller 121.

Figure 2:
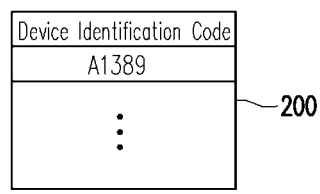
FIG. 2 illustrates a look-up table according to one embodiment of the present invention.

In the present embodiment, after the portable electronic device 50 is plugged to the connector 140 causing the computer apparatus 100 to boot up and after the connector controller 121 associated with the connector 140 is initialized, the BIOS first sends an enquiry command CM1 to the portable electronic device 50 through the connector controller 121. The portable electronic device 500 sends back its device identification code ID1 upon receiving the enquiry command CM1. The BIOS then determines whether the portable electronic device 50 is a predetermined device based on the device identification code ID1 sent back, i.e. determining whether the device identification code ID1 is recorded in the look-up table of the BIOS unit 110. For example, assuming the look-up table is the table 200 of FIG. 2, and the device identification code ID1 of the portable electronic device 50 is "A1389", because "A1389" is recorded in the look-up table 200, the portable electronic device 50 is considered as a predetermined device. The number of the device identification codes in the look-up table may be determined based on the actual requirements and needs. The particular example given above should be considered as illustrative rather than limiting.

When the BIOS determines the portable electronic device 50 to be a predetermined device, the BIOS controls the connector controller 121 to send a charging command CM2 to the portable electronic device 50 to activate a charging function of the portable electronic device 50 such that the portable electronic device 50 derives a charging current from the computer apparatus 100. In addition, after the connector controller 121 sends out the charging command CM2, the BIOS automatically shuts down the computer apparatus 100. In the present embodiment, the BIOS controls the computer apparatus 100 to shut down before an operating system (OS) is loaded. Furthermore, after the computer apparatus 100 shuts down, the portable electronic device 50 can still continuously derive the charging current from the computer apparatus 100.

On the other hand, when the portable electronic device 50 is not a predetermined device, the BIOS ignores the portable electronic device 500 without any further processing and then shuts down the computer apparatus 100.

As described above, in the present embodiment, after the portable electronic device 50 is plugged to the connector 140 causing the computer apparatus 100 to boot up and after the connector controller 121 associated with the connector 140 is initialized, the BIOS sends the charging command CM2 to the portable electronic device 50, such that the portable electronic device 50 starts deriving a charging current from the computer apparatus 100 and therefore starts to be charged. The charging current may be derived from the standby power of the computer apparatus 100.

In addition, the computer apparatus 100 is controlled to shut down after the BIOS sends out the charging command CM2 and before the OS is loaded on the computer apparatus 100. Therefore, the computer apparatus 100 boots up and then shuts down in a very short time. In order not to cause confusion to the user, in another embodiment, the BIOS further controls a display device 160 electrically connected to the North Bridge chip 131 of the central processing unit 130 to display a black screen during the boot process of the computer apparatus 100. That is, the BIOS controls the North Bridge chip 131 of the central processing unit 130 not to output any signal to the display device 160, such that the computer apparatus 100 can avoid a sudden display of a boot screen on the display device 160 and then a sudden shutdown of the computer apparatus 100.

The plugging boot function of the connector controller 121 of the present embodiment is further explained below. When the computer apparatus 100 is in the normal boot state, for example, the boot is caused by pressing the power button. The user can set whether to enable the plugging boot function of the connector controller 121 via application program of the operating system or operating environment of BIOS.

When the user sets to enable the plugging boot function of the connector controller 121, the BIOS can receive a setting command generated according to the user setting. As such, during the period of shutting down of the computer apparatus 100, the BIOS can intercept a shutdown signal of the computer apparatus 100 and then write a set value into a register (not shown) in the South Bridge chip 120 to set the plugging boot function of the connector controller 121 of the computer apparatus 100.

Likewise, the user may also set to disable the plugging boot function of the connector controller 121 via application program of the operating system or BIOS.

Figure 3:
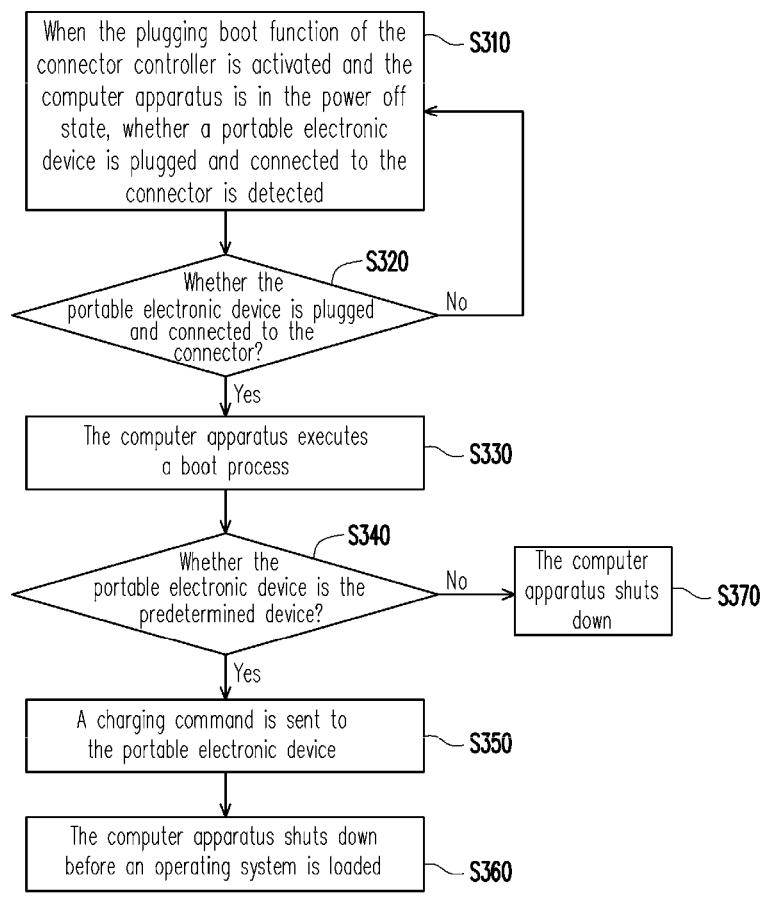
FIG. 3 is a flow chart of a method for charging a portable electronic device using the computer apparatus according to one embodiment of the present invention.

A method for charging a portable electronic device can be generalized based on the above description of the computer apparatus 100. FIG. 3 is a flow chart of a method for charging a portable electronic device using the computer apparatus according to one embodiment of the present invention. Referring to FIG. 3, when the plugging boot function of the connector controller is activated and the computer apparatus is in the power off state, the connector controller detects whether a portable electronic device is plugged and connected to the connector (step S310). If no portable electronic device is plugged and connected to the connector (step S320), then the method returns to step S310 at which the connector controller continues the detection. On the contrary, if a portable electronic device is plugged and connected to the connector (step S320), the connector controller causes the computer apparatus to execute the boot process (step S330). Then, the BIOS determines whether the portable electronic device is a predetermined device (step S340). When the portable electronic device is the predetermined device, the BIOS then sends a charging command to the portable electronic device such that the portable electronic device derives a charging current from the computer apparatus (step S350). Then, the computer apparatus is caused to shut down (step S360) before an operating system is loaded. On the contrary, when the portable electronic device is not the predetermined device, the BIOS causes the computer apparatus to shut down (step S370). The details of the above steps can be referred to the foregoing descriptions of the computer apparatus 100, these details are not repeated herein.

In summary, in the method for charging a portable electronic device using the computer apparatus of embodiments of the present invention, the computer apparatus is caused to temporarily boot up upon a portable electronic device is plugged thereto. During the temporal boot process, it is detected whether the portable electronic device is a predetermined device so as to determine whether to send a charging command to the portable electronic device. As such, if the portable electronic device has the charging function, the computer apparatus can activate the charging function of the portable electronic device at any time.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for charging a portable electronic device, the method implemented in a computer apparatus comprising a connector, the method comprising:
   (a) detecting whether the portable electronic device is plugged and connected to the connector when the computer apparatus is in a power off state;
   (b) causing the computer apparatus to execute a boot process if the portable electronic device is plugged and connected to the connector;
   (c) determining whether the portable electronic device is a predetermined device;
   (d) sending a charging command to the portable electronic device such that the portable electronic device derives a charging current from the computer apparatus only if the portable electronic device is the predetermined device; and
   (e) causing the computer apparatus to shut down before an operating system is loaded.

2. The method according to claim 1, wherein, subsequent to step (e), the portable electronic device continuously derives the charging current from the computer apparatus.

3. The method according to claim 1, wherein the computer apparatus comprises a connector controller having a plugging boot function, the steps of setting the plugging boot function comprising: receiving a setting command when the computer apparatus is in a power on state; intercepting a shutdown signal of the computer apparatus during the period of shutting down of the computer apparatus; and setting the plugging boot function of the connector controller of the computer apparatus.

4. The method according to claim 1, wherein step (c) further comprises: (c1) sending an enquiry command to the portable electronic device to obtain a device identification code of the portable electronic device; and (c2) comparing the device identification code of the portable electronic device with a look-up table.

5. The method according to claim 1, wherein step (b) further comprises controls a processing unit of the computer apparatus not to output a display signal to a display device of the computer apparatus, such that no change to the display occurs as a result of connecting the portable electronic device to the connector.

6. A computer apparatus adapted for connecting with a portable electronic device, the computer apparatus comprising:
- a connector for connecting with the portable electronic device;
- a connector controller connected to the connector; and
- a basic input/output system unit connected to the connector controller and storing a basic input/output system program therein;
- wherein, when the computer apparatus is in a power off state, the connector controller detects whether the portable electronic device is plugged and connected to the connector;
- if the portable electronic device is plugged and connected to the connector, the connector controller causes the computer apparatus to execute the basic input/output system program of a boot process;
- if the basic input/output system program determines that the portable electronic device is a predetermined device, the basic input/output system program sends a charging command to the portable electronic device such that the portable electronic device derives a charging current from the computer apparatus;
- the basic input/output system program then causes the computer apparatus to shut down before an operating system is loaded.

7. The computer apparatus according to claim 6, wherein the connector controller has a plugging boot function enabling the computer apparatus to detect whether the portable electronic device is connected to the connector when the computer apparatus is in a shut-down state.

8. The computer apparatus according to claim 6, wherein the connector controller has a plugging boot function, the steps of setting the plugging boot function comprising: receiving a setting command when the computer apparatus is in a power on state; intercepting a shutdown signal of the computer apparatus during the period of shutting down of the computer apparatus; and setting the plugging boot function of the connector controller of the computer apparatus.

9. The computer apparatus according to claim 6, wherein the connector is a universal serial bus connector.

10. The computer apparatus according to claim 6, wherein the basic input/output system program sends an enquiry command to the portable electronic device to obtain a device identification code of the portable electronic device, and the basic input/output system program compares the device identification code of the portable electronic device with a look-up table to determine whether the portable electronic device is the predetermined device.

11. The computer apparatus according to claim 6, wherein the basic input/output system program controls the computer apparatus to stop outputting a display signal to a display device of the computer apparatus after the connector controller causes the computer apparatus to execute the boot process.

12. The computer apparatus according to claim 6, wherein the basic input/output system unit controls a processing unit of the computer apparatus not to output any signal to a display device, such that no change to the display occurs as a result of connecting the portable electronic device to the connector.

* * * * *